(12) United States Patent
Yang et al.

(10) Patent No.: US 11,536,954 B2
(45) Date of Patent: Dec. 27, 2022

(54) LIDAR MIRROR CONTROL METHOD AND DEVICE AND LIDAR

(71) Applicant: SUTENG INNOVATION TECHNOLOGY CO., LTD., Shenzhen (CN)

(72) Inventors: Shaodong Yang, Shenzhen (CN); Jingyang Zheng, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/707,931

(22) Filed: Mar. 29, 2022

(65) Prior Publication Data

US 2022/0221711 A1    Jul. 14, 2022

Related U.S. Application Data

(63) Continuation of application No. PCT/CN2019/109478, filed on Sep. 30, 2019.

(51) Int. Cl.
   *G02B 26/10* (2006.01)
   *G01S 7/481* (2006.01)
   (Continued)

(52) U.S. Cl.
   CPC .......... *G02B 26/10* (2013.01); *G01S 7/4817* (2013.01); *G05B 1/02* (2013.01); *G05B 1/04* (2013.01);
   (Continued)

(58) Field of Classification Search
   CPC .......... G05B 1/02; G05B 1/04; G05B 11/011; G05B 11/26; G05B 13/04
   (Continued)

(56) References Cited

U.S. PATENT DOCUMENTS

| 5,204,848 A | 4/1993 | Cardero et al. |
| 5,757,751 A * | 5/1998 | Chapman ......... G11B 20/10203 |

(Continued)

FOREIGN PATENT DOCUMENTS

| CN | 101008837 A | 8/2007 |
| CN | 101477248 A | 7/2009 |

(Continued)

OTHER PUBLICATIONS

First Office Action issued in related Chinese Application No. 201980064316.8, dated Jan. 24, 2022, 8 pages.

(Continued)

*Primary Examiner* — David Luo
(74) *Attorney, Agent, or Firm* — Bayes PLLC

(57) ABSTRACT

Embodiments of this application disclose a mirror control method and device and a LiDAR, pertaining to the field of LiDAR. The method includes: outputting a control signal configured to control a mirror to scan; detecting a feedback signal of the scanning mirror; determining an actual amplitude gain of the mirror based on the feedback signal, and determining an error of the actual amplitude gain relative to a preset amplitude gain threshold; and determining a frequency adjustment based on the error, adjusting frequency based on the frequency adjustment, and obtaining an output signal. In the embodiments of this application, stability of a scanning angle of the mirror can be maintained when resonance frequency of the mirror deviates.

9 Claims, 6 Drawing Sheets

(51) Int. Cl.
   *G05B 1/04*  (2006.01)
   *G05B 11/01* (2006.01)
   *G05D 3/20*  (2006.01)
   *G05B 11/26* (2006.01)
   *G05B 1/02*  (2006.01)
   *G05B 13/04* (2006.01)

(52) U.S. Cl.
   CPC ............ *G05B 11/011* (2013.01); *G05B 11/26* (2013.01); *G05B 13/04* (2013.01); *G05D 3/20* (2013.01)

(58) Field of Classification Search
   USPC .................................................. 318/606, 560
   See application file for complete search history.

(56) References Cited

U.S. PATENT DOCUMENTS 7,107,848 B2     9/2006  Turner
   2004/0119811 A1  6/2004  Bush
   2006/0117854 A1  6/2006  Turner
   2011/0019252 A1  1/2011  Fujii et al.

FOREIGN PATENT DOCUMENTS

CN    101778325 A    7/2010
   CN    107526096 A   12/2017
   CN    108089177 A    5/2018
   CN    108594869 A    9/2018
   CN    106526834 B    1/2019
   EP      2738572 A1   6/2014

OTHER PUBLICATIONS

International Search Report issued in corresponding International Application No. PCT/CN2019/109478, dated Jun. 22, 2020, 4 pages.
   Extended European Search Report issued in related European Application No. PCT/CN2019/109478, dated Sep. 29, 2022, 9 pages.
   Anonymous: "Control system-Wikipedia, the free encyclopedia", Sep. 28, 2011, Retrieved from the Internet: https://en.wikipedia.org/wiki/Control_system.

* cited by examiner

LIDAR MIRROR CONTROL METHOD AND DEVICE AND LIDAR

CROSS-REFERENCE TO RELATED APPLICATION

The present application is a continuation of International Application No. PCT/CN2019/109478, filed on Sep. 30, 2019, which is incorporated herein by reference in its entirety.

TECHNICAL FIELD

This application relates to the field of LiDAR, and in particular, to a mirror control method and device and a LiDAR.

BACKGROUND

A crucial device of a solid-state LiDAR is an electromagnetic mirror (hereinafter referred to as mirror). A main working principle of the mirror is combining horizontal scanning and vertical scanning into two-dimensional scanning, and forming a two-dimensional planar array by scanning through specular reflection when a laser beam reaches the vibrating mirror. The mirror is driven by an input single-frequency signal to scan through a simple harmonic motion. The mirror can reach a suitable angle during scanning within a safe gain only when working on resonance frequency. Due to influence of an environmental factor such as temperature during working of the mirror, the resonance frequency of the mirror may deviate, which causes a difference between fast-axis scanning frequency of the mirror and the resonance frequency, thereby changing a scanning angle of the mirror.

SUMMARY

Embodiments of this application provide a mirror control method and device and a LiDAR, which can resolve a problem that a scanning angle of the mirror changes due to deviation of resonance frequency of the mirror. Technical solutions are as follows:

According to a first aspect, an embodiment of this application provides a mirror control method, where the method includes:

outputting a control signal configured to control the mirror to scan;

detecting a feedback signal of the scanning mirror;

determining an actual amplitude gain of the mirror based on the feedback signal, and determining an error of the actual amplitude gain relative to a preset amplitude gain threshold; and determining a frequency adjustment based on the error, adjusting frequency based on the frequency adjustment, and obtaining an output signal.

In some embodiments, obtaining an output signal includes:

generating a single-frequency signal; and performing amplification processing on the single-frequency signal, to obtain the control signal.

In some embodiments, determining an error of an actual amplitude gain relative to an amplitude gain threshold includes:

obtaining a preset amplitude threshold and a preset pulse width threshold, where the pulse width threshold is a pulse width corresponding to the amplitude threshold when the mirror works on the preset resonance frequency;

determining an actual pulse width corresponding to the feedback signal based on the amplitude threshold; and comparing the actual pulse width with the pulse width threshold, to obtain the error.

In some embodiments, the error is an absolute value of a difference between the actual pulse width and the pulse width threshold.

In some embodiments, determining a frequency adjustment based on the error includes:

obtaining the last error and a sign of the last frequency adjustment that are pre-stored;

determining whether a current error is greater than the last error;

if the current error is greater than the last error, taking an opposite of the sign of the last frequency adjustment, to serve as a sign of a current frequency adjustment; or if the current error is not greater than the last error, using the sign of the last frequency adjustment as a sign of a current frequency adjustment; and storing the current error and the sign of the current frequency adjustment.

In some embodiments, determining a frequency adjustment based on the error includes:

determining the frequency adjustment corresponding to the error based on a linear closed-loop control algorithm.

In some embodiments, before determining a frequency adjustment based on the error, the method further includes:

determining that the error is greater than a preset error threshold.

According to a second aspect, an embodiment of this application provides a mirror control device, where the control device includes:

a signal generator, configured to output a control signal, where the control signal is used to control the mirror to scan;

a signal detector, configured to detect a feedback signal of the scanning mirror;

a signal comparator, configured to determine an actual amplitude gain of the mirror based on the feedback signal, and determine an error of the actual amplitude gain relative to a preset amplitude gain threshold; and a linear controller, configured to determine a frequency adjustment based on the error, adjust frequency based on the frequency adjustment, and obtain an output signal.

In some embodiments, the linear controller is a proportional-integral controller.

According to a third aspect, an embodiment of this application provides a LiDAR, including a mirror and the foregoing control device.

The beneficial effects provided by the technical solutions of some embodiments of the present application include at least:

The control signal used to control the mirror to scan is output, the feedback signal indicating a motion state of the mirror is detected, the frequency adjustment is determined based on the error of the actual amplitude gain relative to the amplitude gain threshold that is obtained through the feedback signal, and frequency is adjusted based on the frequency adjustment, to obtain the control signal for driving the mirror scanning, to implement closed-loop control of the amplitude gain of the mirror and control stability of the amplitude gain of the mirror, thereby resolving a problem in a related art that a scanning angle of the mirror changes due to the change in the amplitude gain when resonance frequency deviates because a phase-locked loop is used. In the embodiments of this application, the mirror scans with a stable amplitude gain, thereby ensuring that the mirror scans at a specified scanning angle.

BRIEF DESCRIPTION OF DRAWINGS

To explain embodiments of the present application or the technical solutions more clearly, the following briefly introduces the drawings that need to be used in the embodiments. Obviously, the drawings in the following description are only some embodiments of the present application. A person skilled in the art may obtain other drawings based on these drawings without creative efforts.

DETAILED DESCRIPTION

To make objectives, technical solutions and advantages of the present application clearer, embodiments of the present application are described in further detail below with reference to the drawings.

Figure 1:
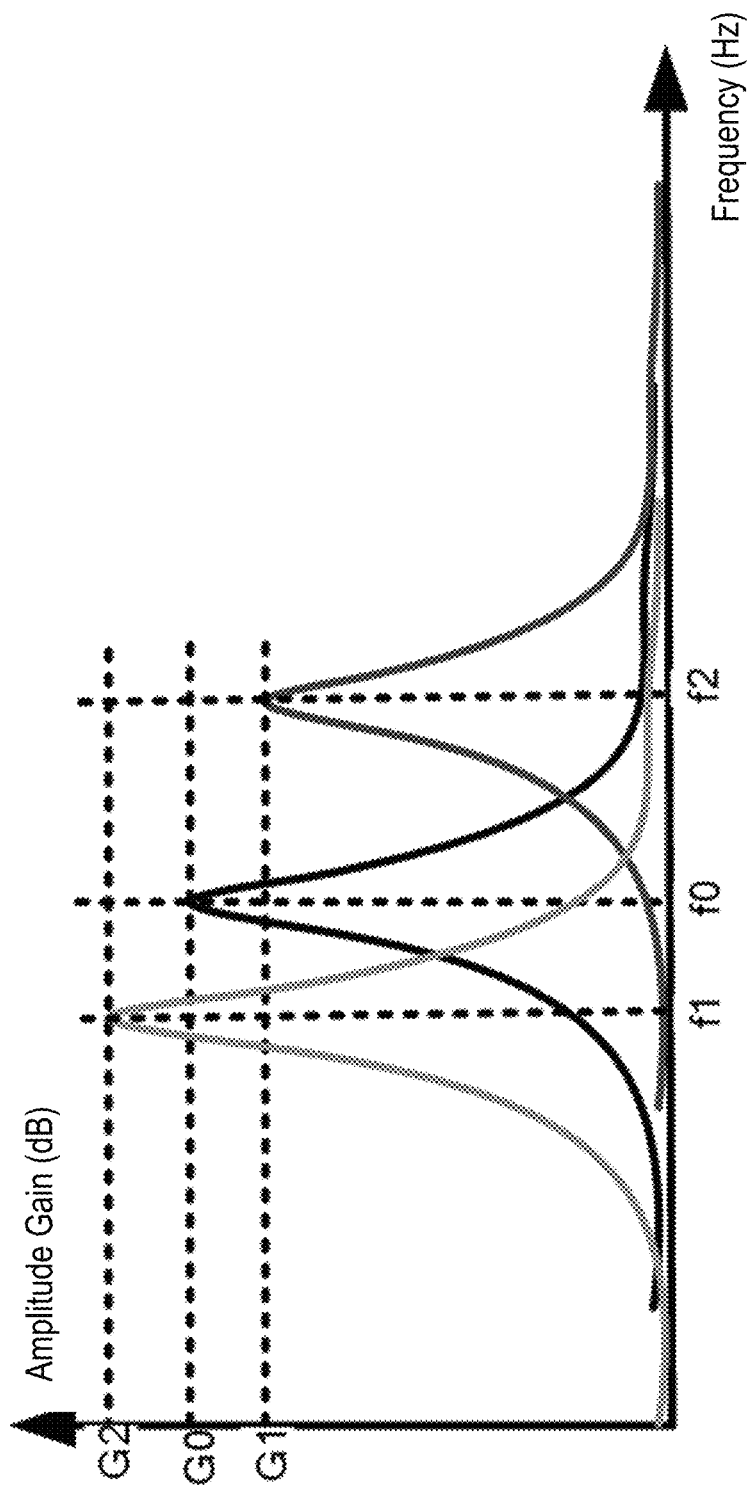
FIG. 1 is a schematic diagram indicating amplitude changes when resonance frequency deviates according to an embodiment of this application.

FIG. 1 is a curve chart of a correspondence between resonance frequency and an amplitude gain of a mirror in a related art.

In the related art, a LiDAR mainly monitors a phase at a zero-crossing point of a feedback signal for mirror movement through a phase-locked loop. When a deviation between the monitored phase and an originally set phase is within a tolerance range, it is considered that resonance frequency is successfully tracked. However, as shown in FIG. 1, resonance frequency of the mirror in an initial state is f0, and a corresponding amplitude gain is G0. The resonance frequency of the mirror is affected by an environmental factor. For example, the mirror is sensitive to ambient temperature, and when the ambient temperature is between 0° C. and 26° C., the resonance frequency of the mirror is f0; when the ambient temperature is below 0° C., the resonance frequency of the mirror is f1; or when the ambient temperature is above 26° C., the resonance frequency of the mirror is f2. The resonance frequency of the mirror is deviated from f0 to f1 or f2. Herein, f0 corresponds to the same phase as f1 and f2. Based on the phase-locked loop, it is believed that the amplitude gain has been locked. However, when the resonance frequency of the mirror is f1, a corresponding amplitude gain is G2, where G2>G1; or when the resonance frequency of the mirror is f2, a corresponding amplitude gain is G1, where G1<G2, and therefore, the gain may change in a deviation process of the resonance frequency of the mirror, which causes a difference between a scanning amplitude and the original amplitude of the mirror.

Figure 2:
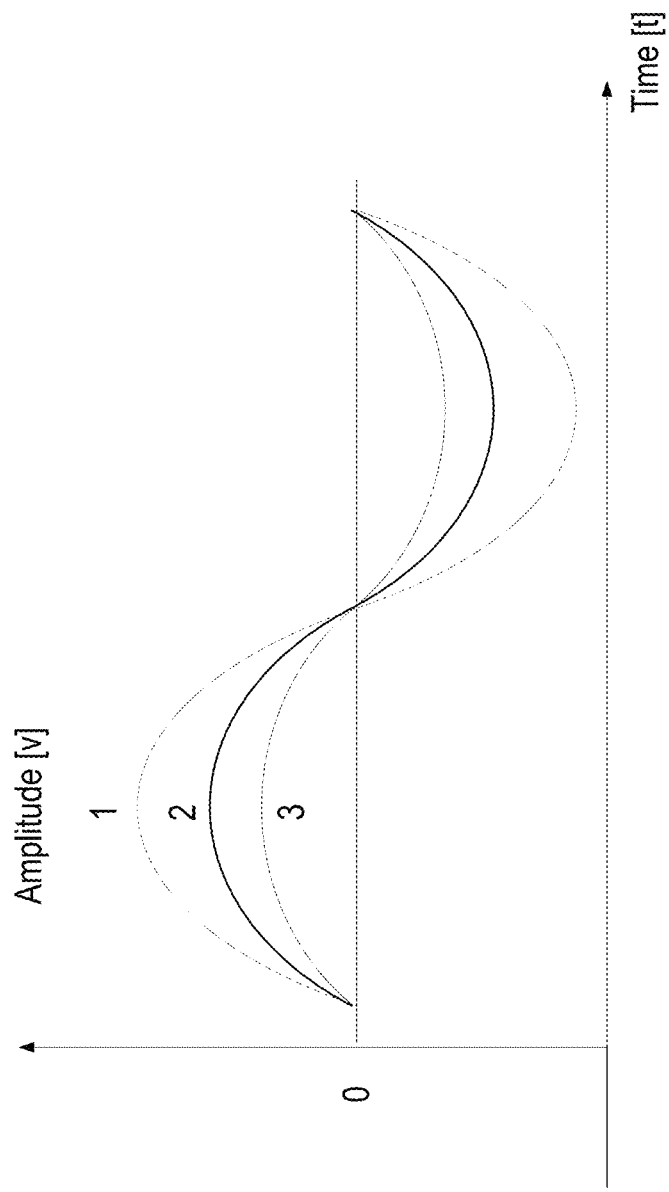
FIG. 2 is a schematic diagram of a feedback signal according to an embodiment of this application.

For example, referring to FIG. 2, FIG. 2 is a curve chart of corresponding feedback signals at different resonance frequency. In FIG. 2, a curve 1, a curve 2, and a curve 3 are arranged from top to bottom respectively. The curve 1 represents a curve chart of a mirror working at the resonance frequency f1, the curve 2 represents a curve chart of a mirror working at the resonance frequency f0, and the curve 3 represents a curve chart of a mirror working at the resonance frequency f2. It can be seen from the figure that the maximum amplitude of the curve 2 is greater than the maximum amplitude of the curve 3 but less than the maximum amplitude of the curve 1.

Figure 3:
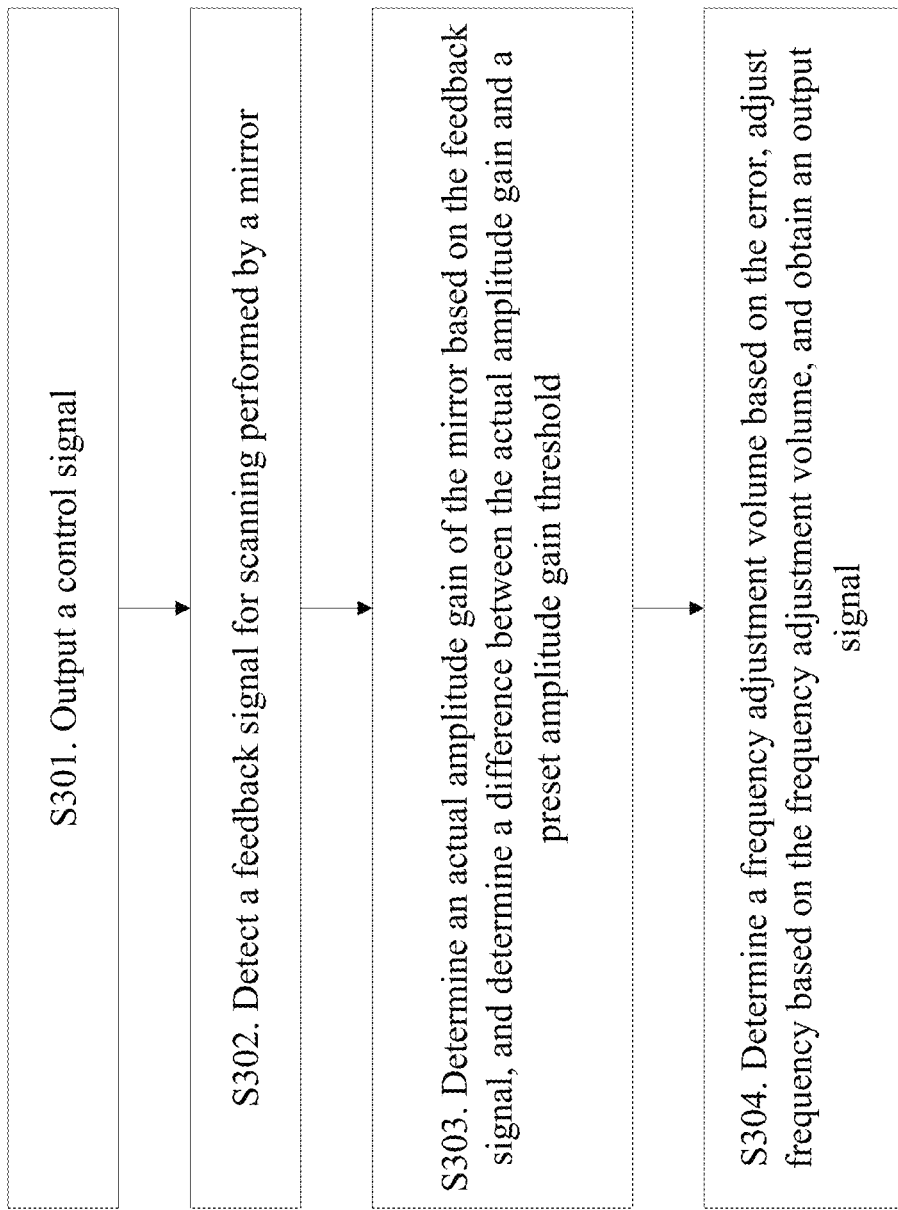
FIG. 3 is a schematic flowchart of a mirror control method according to an embodiment of this application.

FIG. 3 is a schematic flowchart of a mirror control method according to an embodiment of this application. As shown in FIG. 3, the method in this embodiment of the present application may include the following steps:

S301. Output a control signal.

Herein, the control signal is used to control the mirror to scan. The control signal is a single-frequency signal. A type of the control signal may be a sinusoidal signal or a cosine signal. The control signal is used to control the mirror to scan horizontally and vertically in a manner of a simple harmonic motion.

S302. Detect a feedback signal of a scanning mirror.

Herein, the feedback signal is used to indicate the periodic movement of the mirror under the control of the control signal, and a position sensor may be disposed on the mirror, to detect the feedback signal for the mirror. For example, the position sensor may be a gravity sensor, an acceleration sensor, or an angle sensor. Generally, the feedback signal for the mirror is also the single-frequency signal, and there is a phase difference between a phase of the feedback signal and a phase of the control signal. The amplitude of the feedback signal is a deflection angle of the mirror. The amplitude gain of the feedback signal is related to the maximum amplitude of the feedback signal and the maximum amplitude of the control signal. The amplitude gain of the feedback signal is related to the frequency of the control signal. When the frequency of the control signal is equal to the resonance frequency of the mirror, the amplitude gain of the mirror is the maximum.

S303. Determine an actual amplitude gain of the mirror based on the feedback signal, and determine a difference between the actual amplitude gain and a preset amplitude gain threshold.

Herein, an actual amplitude gain of the mirror represents a gain between the maximum amplitude of the feedback signal and the maximum amplitude of the control signal. For example, if the maximum amplitude of the control signal is A1 and the maximum amplitude of the feedback signal for the mirror is A2, an actual amplitude gain of the feedback signal is $10 \times \lg(A2/A1)$ dB. The control device pre-stores or is pre-disposed with a preset amplitude gain, the preset amplitude gain represents the amplitude gain of the mirror working at the preset resonance frequency, and the error may be represented by an absolute value. For example, as shown in FIG. 1, the preset amplitude gain is the amplitude gain of the mirror working at the resonance frequency f0.

Figure 4:
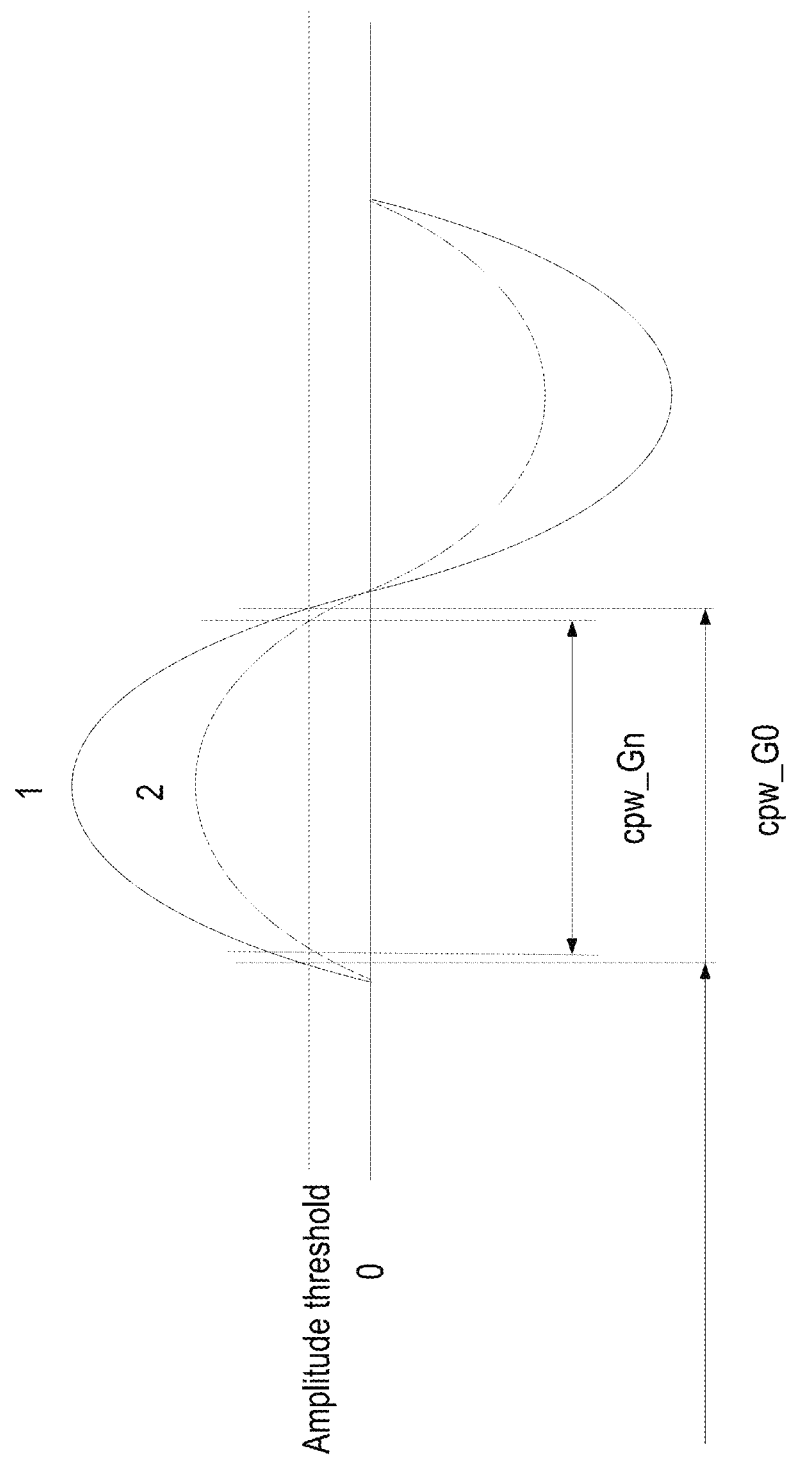
FIG. 4 is a schematic diagram of a principle of error calculation according to an embodiment of this application.

In a possible embodiment, an error calculation method may include:

Referring to FIG. 4, a feedback signal 1 is the feedback signal for the mirror vibrating at the resonant frequency f0. The control device pre-stores an amplitude threshold, and a time width corresponding to the amplitude threshold on the feedback signal 1 is a pulse width threshold cpw_G0. A feedback signal 2 is an actual feedback signal for the mirror, a pulse width cpw_Gn on the feedback signal 2 is determined based on the amplitude threshold, a difference between a pulse width threshold and an actual pulse width is obtained, and an absolute value of the difference, |cpw_G0−cpw_Gn|, is used as the error.

For example, the amplitude threshold is 10 my, the pulse width threshold is 5 s, the control device detects the feedback signal for the mirror, and determines that an actual pulse width corresponding to the amplitude threshold on the feedback signal for the mirror is 4.5 s, and the control device calculates an absolute value of a difference between the pulse width threshold of 5 s and 4.5 s to be 0.5 s, and uses 0.5 s as the error.

In a possible embodiment, an error calculation method may include:

calculating the difference between the amplitude threshold and the maximum amplitude threshold of the feedback signal and using the difference as the error.

For example, the amplitude threshold pre-stored in the control device is 5 mV, the control device determines that the maximum amplitude threshold of the feedback signal is 4 mV, and the control device calculates an absolute value of a difference between the amplitude threshold and the maximum amplitude gain to be 0.5 mV and uses 0.5 mV as the error.

In a possible embodiment, error calculation may include:

calculating the difference between the actual amplitude gain of the feedback signal and the amplitude gain threshold, and using the absolute value of the difference as the error.

For example, the actual amplitude gain of the feedback signal is 35 dB, the pre-stored amplitude gain threshold of the control signal is 40 dB, and the control device calculates an absolute value of a difference between the actual amplitude gain and the amplitude gain threshold to be 5 dB, and uses 5 dB as the error.

S304. Determine a frequency adjustment based on the error, adjust frequency based on the frequency adjustment, and obtain an output signal.

Herein, the frequency adjustment is used to adjust the frequency of a signal generator, and the frequency adjustment has a sign. When the sign of the frequency adjustment is a plus sign, current frequency of the signal generator is increased by the frequency adjustment; or when the sign of the frequency adjustment is a minus sign, the current frequency of the signal generator is reduced by the frequency adjustment. The control device may determine the frequency adjustment according to the error obtained in S303 based on a linear closed-loop control algorithm. The linear closed-loop control algorithm refers to a negative feedback adjustment algorithm with a linear relationship between the error and the frequency adjustment. The linear closed-loop control algorithm includes but is not limited to any one of a proportional-integral control algorithm, a proportional-derivative control algorithm, or a proportional control algorithm.

For example, the current frequency of the control signal output by the signal generator is 100 kHz, the frequency adjustment is +10 kHz, and the signal generator adjusts the frequency of the control signal to 100 kHz+10 kHz=110 kHz; or when the frequency adjustment is −10 kHz, the signal generator adjusts the frequency of the control signal to 100 kHz−10 kHz=90 kHz.

In a possible embodiment, a method for determining a sign of a frequency adjustment includes:

obtaining the last error and a sign of the last frequency adjustment that are stored;

determining whether a current error is greater than the last error;

if the current error is greater than the last error, taking the opposite sign of the last frequency adjustment, to serve as a sign of a current frequency adjustment; or if the current error is not greater than the last error, using the sign of the last frequency adjustment as a sign of a current frequency adjustment; and storing the current error and the current frequency adjustment.

Herein, the sign of the frequency adjustment is a plus sign or a minus sign. When the frequency adjustment is positive, it indicates an increase by the frequency adjustment; or when the frequency adjustment is negative, it indicates a decrease by the frequency adjustment. The current error calculated by the control device is W(n), and the current frequency adjustment is Δf(n); the last error obtained is W(n−1), and a sign of the last frequency adjustment is S(n−1). W(n) and W(n−1) are compared. When W(n)>W(n−1), it indicates that the error is increased, then sign S(n−1) of the last frequency adjustment is negated to obtain −S(n−1), and −S(n−1) is used as the sign of the current frequency adjustment; or when W(n)≤W(n−1), then the sign S(n) of the last frequency adjustment is used as the sign of the current frequency adjustment. The control device stores the current error W(n) and the sign of the current frequency adjustment. It should be understood that n is an integer greater than or equal to 2, and when n=1, a sign of the initial frequency adjustment Δf(1) may be a minus sign or a plus sign.

For example, the last error stored in the control device is a1 s, and the sign of the last frequency adjustment is +; and the control device calculates the current error to be a2 s, and determines that the current error of a2 s is greater than the last error of a1 s, and the control device negates the sign + of the last frequency adjustment to obtain the sign −. The current frequency adjustment is 10 kHz, and the control device instructs the signal generator to reduce the current frequency by 10 kHz.

For another example, the last error stored in the control device is a1 s, and the sign of the last frequency adjustment is +; and the control device calculates the current error to be a2 s, and determines that the current error of a2 s is less than the last error of a1 s, and the control device uses the sign + of the last frequency adjustment as the sign of the current frequency adjustment. The current frequency adjustment is 10 kHz, and the control device instructs the signal generator to increase the current frequency by 10 kHz.

In a possible embodiment, before determining a frequency adjustment based on the error, the method further includes:

determining that the error is greater than an error threshold.

Herein, the control device pre-stores the error threshold, and the control device determines whether the current error is greater than the error threshold; and if yes, S304 is performed; or if no, frequency adjustment is not performed.

In this embodiment of the present application, the control signal used to control the mirror to scan is output, the feedback signal indicating a motion state of the mirror is detected, the frequency adjustment is determined based on the error of the actual amplitude gain relative to the amplitude gain threshold that is obtained through the feedback signal, and frequency is adjusted based on the frequency adjustment, to obtain the control signal for driving the mirror scanning, to implement closed-loop control of the amplitude gain of the mirror and control stability of the amplitude gain of the mirror, thereby resolving a problem in a related art that a scanning angle of the mirror changes due to the change in the amplitude gain when resonance frequency deviates because a phase-locked loop is used. In this embodiment of the present application, the mirror scans with a stable amplitude gain, thereby ensuring that the mirror scans at a specified scanning angle.

A device embodiment of this application is provided below, and can be used to perform the method embodiments of this application. For details not disclosed in this device embodiment of this application, refer to the method embodiments of this application.

Figure 5:
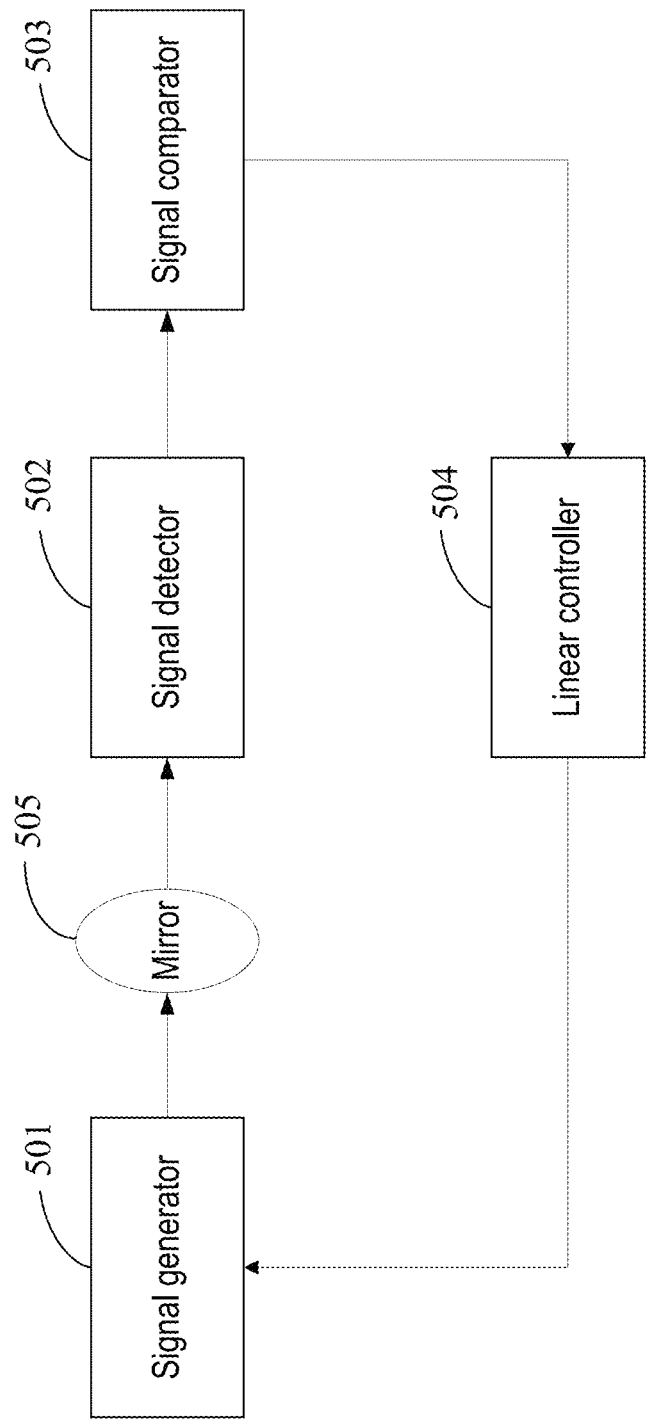
FIG. 5 is a schematic structural diagram of a mirror control device according to this application.

FIG. 5 is a schematic structural diagram of a mirror control device according to an example embodiment of this application. The mirror control device is referred to as a control device 5 below. The control device 5 can become all or a part of the LiDAR through software, hardware or a combination of thereof. The control device 5 includes a signal generator 501, a signal detector 502, a signal comparator 503, and a linear controller 504.

Herein, the signal generator 501 is connected to the mirror 505, the mirror 505 is connected to the signal detector 502, the signal detector 502 is connected to the signal comparator 503, the signal comparator 503 is connected to the linear controller 504, and the linear controller 504 is connected to the signal generator 501. The signal generator 501, the mirror 505, the signal detector 502, the signal comparator 503, and the linear controller 504 form a feedback control loop. For example, the type of linear controller 504 may be a proportional-integral controller or a proportional controller.

The signal generator 501 is configured to output a control signal, where the control signal is used to control the mirror to scan.

The signal detector 502 is configured to detect a feedback signal of the scanning mirror 505.

The signal comparator 503 is configured to determine an actual amplitude gain of the mirror based on the feedback signal, and determine an error of the actual amplitude gain relative to a preset amplitude gain threshold.

The linear controller 504 is configured to determine a frequency adjustment based on the error, adjust frequency based on the frequency adjustment, and obtain an output signal.

In a possible embodiment, obtaining an output signal includes:

generating a single-frequency signal; and performing amplification processing on the single-frequency signal, to obtain the control signal.

In a possible embodiment, determining an error of an actual amplitude gain relative to an amplitude gain threshold includes:

obtaining a preset amplitude threshold and a preset pulse width threshold, where the pulse width threshold is a pulse width corresponding to the amplitude threshold when the mirror works on the preset resonance frequency;

determining an actual pulse width corresponding to the feedback signal based on the amplitude threshold; and comparing the actual pulse width with the pulse width threshold, to obtain the error.

In a possible embodiment, the error is an absolute value of a difference between the actual pulse width and the pulse width threshold.

In a possible embodiment, determining a frequency adjustment based on the error includes:

obtaining the last error and a sign of the last frequency adjustment that are pre-stored;

determining whether a current error is greater than the last error;

if the current error is greater than the last error, taking the opposite sign of the last frequency adjustment, to serve as a sign of a current frequency adjustment; or if the current error is not greater than the last error, using the sign of the last frequency adjustment as a sign of a current frequency adjustment; and storing the current error and the sign of the current frequency adjustment.

In a possible embodiment, determining a frequency adjustment based on the error includes:

determining the frequency adjustment corresponding to the error based on a linear closed-loop control algorithm.

In a possible embodiment, the signal comparator 503 is further configured to determine that the error is greater than a preset error threshold.

It should be noted that, when the control device 5 provided in the foregoing embodiment performs the mirror control method, division of the foregoing functional modules is used as an example for illustration. In actual application, the foregoing functions can be allocated to different functional modules for implementation based on a requirement, that is, an inner structure of the device is divided into different functional modules to implement all or some of the functions described above. In addition, embodiments of the mirror control device and the mirror control method provided above pertain to a same concept. For a specific implementation process, refer to the method embodiments. Details are not described herein again.

Sequence numbers of the embodiments of this application are only intended for description, and do not indicate advantages or disadvantages of the embodiments.

An embodiment of this application also provides a computer storage medium. The computer storage medium may store a plurality of instructions. The instructions are capable of being loaded by a processor to perform the steps of the method in the embodiments shown in FIG. 3 to FIG. 4. For a specific execution process, refer to the specific description of the embodiments shown in FIG. 3 to FIG. 4. Details are not described herein again.

This application also provides a computer program product. The computer program product stores at least one instruction. The at least one instruction is loaded and executed by the processor to implement the mirror control method in the foregoing embodiments.

Figure 6:
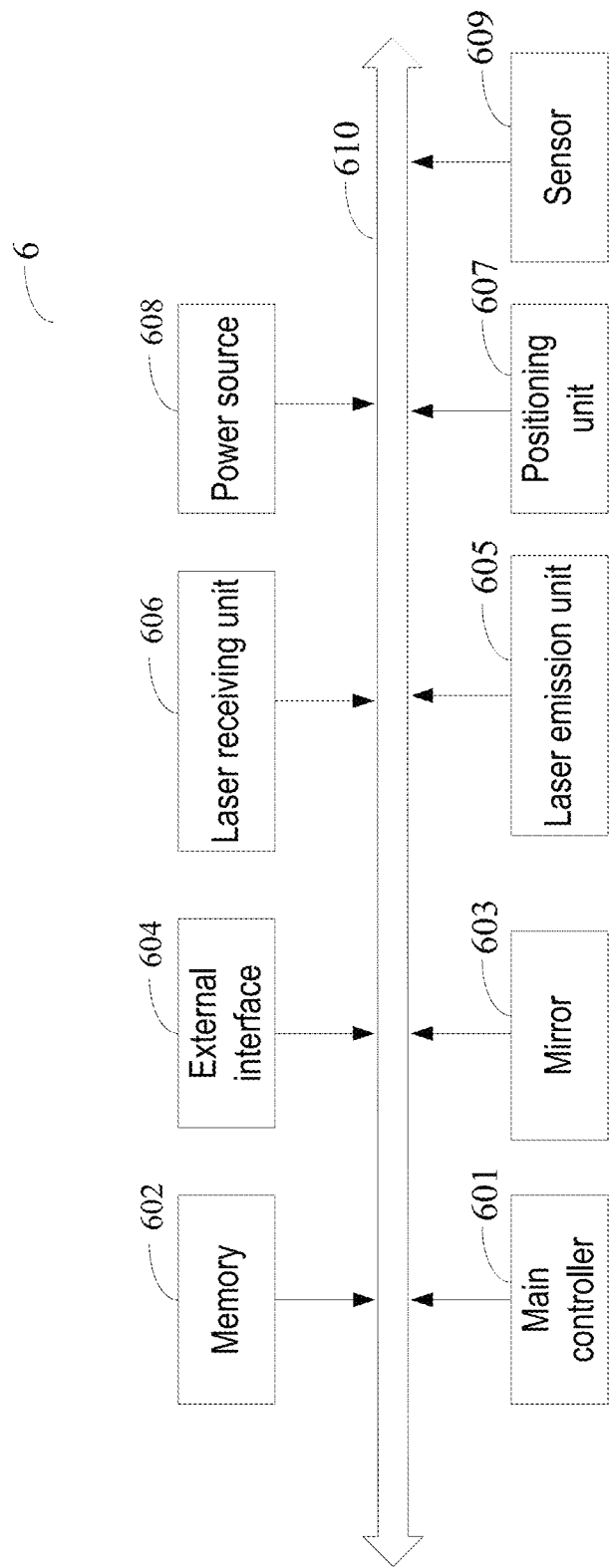
FIG. 6 is a schematic structural diagram of a LiDAR according to this application.

FIG. 6 is a schematic structural diagram of a LiDAR according to an embodiment of this application. As shown in FIG. 6, LiDAR 6 may include at least one main controller 601, a memory 602, a mirror 603, and at least one communications bus 610.

Herein, the communications bus 610 is configured to implement a connection and communication between various components in the LiDAR 6. For example, the communications bus 610 is a CAN (controller area network) bus.

Herein, the LiDAR 6 further includes an external interface 604, a laser emission unit 605, a laser receiving unit 606, a positioning unit 607, a power source 608, and a sensor 609. The external interface 604 is used for data transmission with a peripheral device. For example, the external interface 604 includes a serial port, a local area network interface, and the like. The laser emission unit 605 is configured to emit a laser for detecting an object. The laser emission unit 605 may include a boost power source, an LD driving switch, a laser device, an emission temperature control unit, and a power supply. The laser receiving unit 606 receives the laser reflected by the object. The power source 608 is configured to provide a working voltage for the LiDAR. The positioning unit 607 is configured to obtain position information. For example, the positioning unit 607 may be a GPS (Global Positioning System) positioning unit. The sensor 609 is configured to measure an environmental parameter or an attitude parameter. For example, the sensor 609 includes a temperature sensor and an attitude sensor, the temperature sensor is configured to detect ambient temperature, and the attitude sensor is configured to detect a current attitude.

Herein, the main controller 601 may include one or more processing cores. The main controller 601 uses various interfaces and lines to connect various parts of the entire LiDAR 6, and executes various functions and processes data of the LiDAR 6 by running or executing instructions, programs, code sets, or instruction sets stored in the memory 602, and invoking data stored in the memory 602. Optionally, the main controller 601 may be realized in at least one hardware form of digital signal processing (DSP), a field-programmable gate array (FPGA), and a programmable logic array (PLA). The main controller 601 may integrate a combination of one or more of a central processing unit (CPU), a graphics processing unit (GPU), a modem, and the like. The GPU is configured to render and draw content that needs to be displayed on a display. The modem is configured to process wireless communication. It may be understood that the forgoing modem may not be integrated into the main controller 601, and may be implemented by one chip independently.

The memory 602 may include a random access memory (RAM), or a read-only memory (ROM). Optionally, the memory 602 includes a non-transitory computer-readable medium. The memory 602 may be configured to store instructions, programs, codes, code sets, or instruction sets. The memory 602 may include a program storage region and a data storage region. The program storage region may store instructions for implementing the operating system, instructions for at least one function (such as a touch control function, a sound play function, and an image play function), and instructions for implementing each of the foregoing method embodiments. Optionally, the memory 602 may also be at least one storage device distant from the forgoing main controller 601.

In the LiDAR 6 shown in FIG. 6, the main controller 601 may be configured to invoke the computer program stored in the memory 602, and specifically execute the following steps:

outputting a control signal, where the control signal is used to control the mirror to scan;

detecting a feedback signal for the scanning performed by the mirror;

determining an actual amplitude gain of the mirror based on the feedback signal, and determining an error of the actual amplitude gain relative to a preset amplitude gain threshold; and determining a frequency adjustment based on the error, adjusting the frequency based on the frequency adjustment, and obtaining an output signal.

In a possible embodiment, obtaining, by the main controller 601, an output signal includes:

generating a single-frequency signal; and performing amplification processing on the single-frequency signal, to obtain the control signal.

In a possible embodiment, determining, by the main controller 601, an error of an actual amplitude gain relative to an amplitude gain threshold includes:

obtaining a preset amplitude threshold and a preset pulse width threshold, where the pulse width threshold is a pulse width corresponding to the amplitude threshold when the mirror works on the preset resonance frequency;

determining an actual pulse width corresponding to the feedback signal based on the amplitude threshold; and comparing the actual pulse width with the pulse width threshold, to obtain the error.

In a possible embodiment, the error is an absolute value of a difference between the actual pulse width and the pulse width threshold.

In a possible embodiment, determining, by the main controller 601, a frequency adjustment based on the error includes:

obtaining the last error and a sign of the last frequency adjustment that are pre-stored;

determining whether a current error is greater than the last error;

if the current error is greater than the last error, taking the opposite sign of the last frequency adjustment, to serve as a sign of a current frequency adjustment; or if the current error is not greater than the last error, using the sign of the last frequency adjustment as a sign of a current frequency adjustment; and storing the current error and the sign of the current frequency adjustment.

In a possible embodiment, determining, by the main controller 601, a frequency adjustment based on the error includes:

determining the frequency adjustment corresponding to the error based on a linear closed-loop control algorithm.

In a possible embodiment, the main controller 601 is further configured to determine that the error is greater than a preset error threshold.

Herein, the embodiment in FIG. 6 and the method embodiment in FIG. 3 are based on the same concept, and have the same technical effects. For a specific implementation process of FIG. 6, refer to the description of FIG. 3. Details are not described herein again.

The person skilled in the art can understand that all or part of procedures in methods of the forgoing embodiments can be implemented by instructing relevant hardware via computer program. The program can be stored in a computer readable storage medium. During execution, the computer program can include the procedures of the embodiments of the forgoing methods. A storage medium can be a magnetic disk, an optical disc, a read-only storage memory, or a random storage memory, and so on.

The disclosed forgoing are only preferred embodiments of the present application, which of course cannot be used to limit the scope of rights of the present application. Therefore, equivalent changes made in accordance with the claims of the present application still fall within the scope of the application.

What is claimed is:

1. A method for controlling a mirror, comprising:

outputting a control signal configured to control the mirror to scan;

detecting a feedback signal of the scanning mirror;

determining an actual amplitude gain of the mirror based on the feedback signal;

obtaining a preset amplitude threshold and a preset pulse width threshold, wherein the preset pulse width threshold is a pulse width corresponding to the preset amplitude threshold when the mirror works on preset resonance frequency;

determining an actual pulse width corresponding to the feedback signal based on the preset amplitude threshold;

comparing the actual pulse width with the preset pulse width threshold, to obtain the error;

determining a frequency adjustment based on the error, adjusting frequency based on the frequency adjustment, and obtaining an output signal.

2. The method of claim 1, wherein the outputting a control signal comprises:
   generating a single-frequency signal; and
   performing amplification processing on the single-frequency signal, to obtain the control signal.

3. The method of claim 1, wherein the error is an absolute value of a difference between the actual pulse width and the preset pulse width threshold.

4. The method of claim 3, wherein the determining a frequency adjustment based on the error comprises:
   obtaining a last error and a sign of a last frequency adjustment that are pre-stored;
   determining whether a current error is greater than the last error;
   in response to the current error being greater than the last error, taking an opposite of the sign of the last frequency adjustment, to serve as a sign of a current frequency adjustment; or
   in response to the current error being not greater than the last error, using the sign of the last frequency adjustment as a sign of a current frequency adjustment; and
   storing the current error and the sign of the current frequency adjustment.

5. The control method of claim 4, wherein before the determining a frequency adjustment based on the error, the method further comprises:
   determining that the error is greater than a preset error threshold.

6. The method of claim 3, wherein the determining a frequency adjustment based on the error comprises:
   determining the frequency adjustment corresponding to the error based on a linear closed-loop control algorithm.

7. A device for controlling a mirror, comprising:
   a signal generator, configured to output a control signal, wherein the control signal is used to control the mirror to scan;
   a signal detector, configured to detect a feedback signal of the scanning mirror;
   a signal comparator, configured to determine an actual amplitude gain of the mirror based on the feedback signal, and obtain a preset amplitude threshold and a preset pulse width threshold, wherein the preset pulse width threshold is a pulse width corresponding to the preset amplitude threshold when the mirror works on preset resonance frequency, and determine an actual pulse width corresponding to the feedback signal based on the preset amplitude threshold, and compare the actual pulse width with the preset pulse width threshold, to obtain the error; and
   a linear controller, configured to determine a frequency adjustment based on the error, adjust frequency based on the frequency adjustment, and obtain an output signal.

8. The device of claim 7, wherein the linear controller is a proportional-integral controller.

9. A LiDAR, comprising a mirror and a device for controlling the mirror according to claim 7.

* * * * *